Feb. 24, 1942. A. M. FISCHER 2,273,853
BREWING
Filed Oct. 22, 1937 3 Sheets-Sheet 1

INVENTOR
Albert M. Fischer
BY
Pennie, Davis, Marvin & Edmonds
ATTORNEYS

Feb. 24, 1942.      A. M. FISCHER      2,273,853
BREWING
Filed Oct. 22, 1937      3 Sheets-Sheet 2
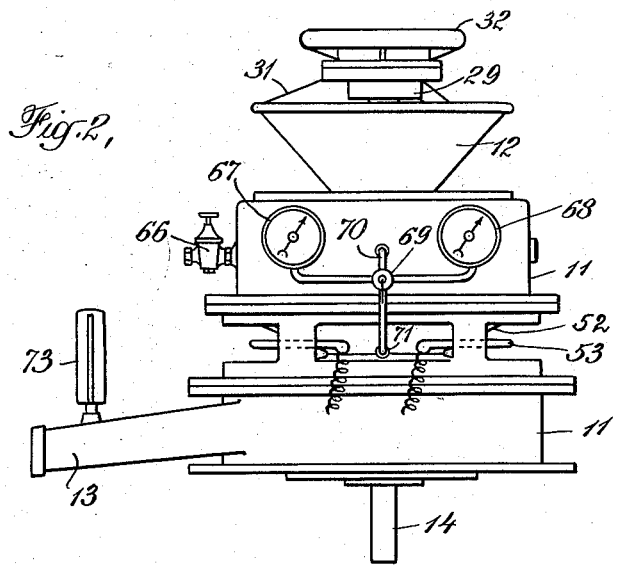
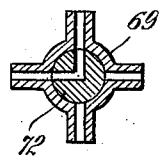
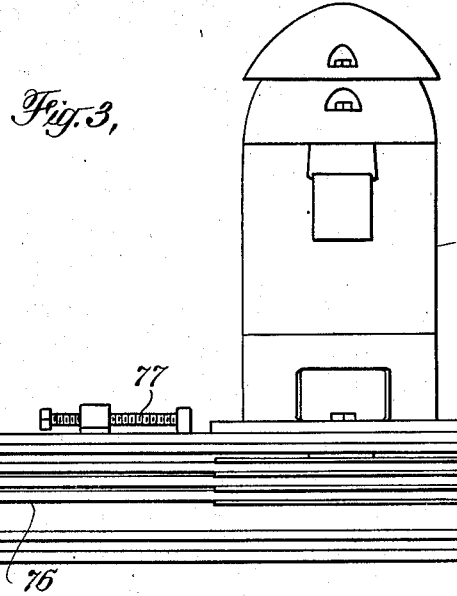
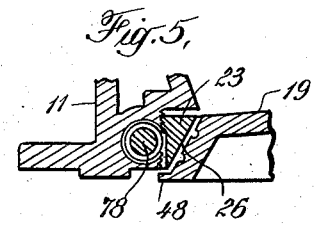
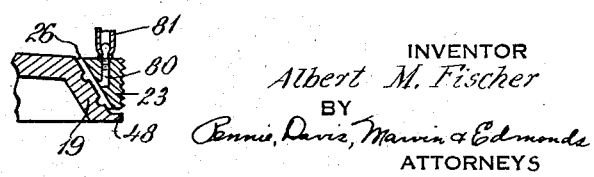
INVENTOR
Albert M. Fischer
BY
Pennie, Davis, Marvin & Edmonds
ATTORNEYS

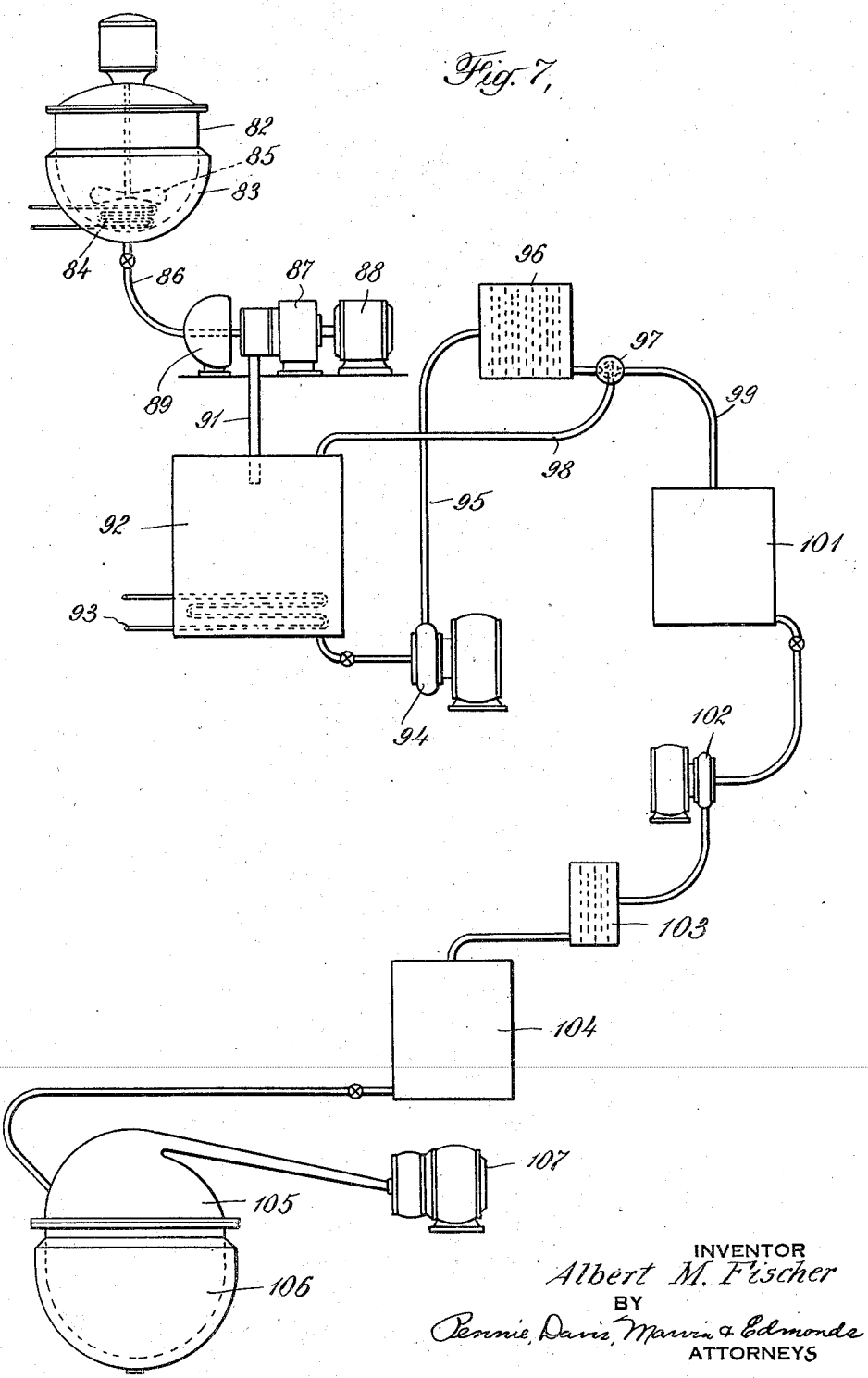

Patented Feb. 24, 1942

2,273,853

UNITED STATES PATENT OFFICE 2,273,853

BREWING

Albert M. Fischer, Chicago, Ill., assignor to Rotary Extractor Corporation, Long Island City, N. Y., a corporation of New York Application October 22, 1937, Serial No. 170,485

33 Claims. (Cl. 99—31)

This invention relates particularly to the art of brewing beer, and has for an object the provision of an improved brewing process and system whereby, among other advantages, an improved beer product having better taste and aroma, better keeping qualities, and a higher nutritive value than the beers heretofore available may be produced. The invention is particularly directed to the provision of a vitamin beer, especially one to which the original yeast vitamins have been restored.

Although the invention is particularly directed to the brewing of beer, certain features have somewhat broader application. Thus, the yeast extract produced in accordance with this process, being rich in vitamins, enzymes, mineral salts and other physiologically active substances, may be used for purposes other than the brewing of beer, especially in other potables.

This application is in part a continuation of my prior co-pending application Serial No. 737,877, filed August 1, 1934.

Beer has long been considered a food beverage having a highly nutritious food content. Indeed, beer has often been called "liquid bread." In former years this was indeed an appropriate name, but, unfortunately, at the present time it is not so truly the case.

In former years it was not customary to filter the beer as sharply as at the present time. Consequently yeast cells were left in the finished beer, thus contributing their vitamin and enzymic content to the otherwise purely caloric content of the beer. Thus the finished beer was a well-balanced nutritious beverage, possessing both caloric and vitamin content.

However, in modern brewing practice, particularly in the American type of Pilsener beer, it is considered highly desirable to obtain a clear, brilliant product. To obtain such a product, it is customary to subject the beer to very sharp filtration before the beer is bottled or otherwise packaged for use. In this final filtration all the yeast cells are removed.

It has been established that although large quantities of vitamins are present in the beer during the brewing process, coming from both the wort and the pitching yeast, these vitamins are absorbed to a large extent, if not entirely, by the yeast during the fermenting operation. These vitamins are apparently not released by healthy yeast cells under normal brewing conditions and are, of course, removed with the yeast cells during the final filtration. Yeast contains other valuable factors such as enzymes, mineral salts, lecithin, etc., which are also removed in the final filtration. The great nutritional and therapeutical value of these substances is recognized and accepted by scientists, yet the brewing methods customarily employed do not secure their incorporation into the finished product to an appreciable extent.

It is an object of the present invention to restore these yeast vitamins and enzymes, which were formerly present in the finished beer, to beers of the modern brilliant type. The incorporation of vitamins in beer is rendered difficult by the highly sensitive nature of the beverage. Any change in the brewing process, and particularly the addition of any foreign substances, are carefully scrutinized by the brewmaster. It is, therefore, important not to impair the ordinary characteristics of the beer, such as taste, brilliancy, aroma, foam, stability, etc., in vitaminizing the beer.

A number of methods for incorporating vitamins into finished beer have heretofore been suggested. Among these methods might be mentioned the addition of autolyzed yeast to the beer, with or without subsequent irradiation of the beer by ultra-violet rays. In the processes employing autolyzed yeast, the yeast cells are completely destroyed by autolysis and the entire cell content released. This is customarily accomplished by prolonged heating of the yeast cells. This process has not been found satisfactory since the addition of autolyzed yeast to the beer has been found to adversely affect its taste. This is perhaps due to the chemical changes which take place during the autolysis process.

In the usual method of brewing, yeast is added to the wort for the first or main fermentation, which lasts normally for a period of from 7 to 10 days. During this period the yeast propagates itself and normally increases from 3 to 5 times in volume. After the main fermentation is completed most of the yeast is removed, and the beverage then undergoes a second or "after" fermentation, during the lager period, which is comparatively gentle and mild and for the purpose of improving the taste and aroma of the beer. In cases where the Krausen method is employed, a quantity of yeast from the main fermentation stage is added during this lager period in order to saturate the beer with natural $CO_2$. When this aging or lager period is completed, the yeast still in suspension in the beer is removed by sharp filtration in order to obtain a sparkling and stable beer, and the beer bottled or otherwise packaged for consumption.

In accordance with the present invention, a quantity of yeast is aged with a suitable solute or solutes, for example, common salt and cane sugar, and the mixture passed through a suitably constructed colloid mill, the conditions being so controlled that a portion of the yeast cell content is extracted without the disruption of the yeast cell membranes. Thus, the yeast cell wall is employed as a filter, and only those portions of the cell content which can pass through the cell wall is extracted. In this manner an extract of pleasant flavor may be obtained, free of yeast-cells and free of those portions of the cell contents which are not permeable through the cell membranes. The extract so obtained, with or without ultra-violet irradiation, is added to the beer at the desired point in the brewing operation.

Describing the process of the invention in more detail:

Yeast employed

The yeast employed is preferably brewer's yeast obtained from the surplus yeast produced during the fermentation of the beer, since large quantities of yeast are produced in this manner and are customarily discarded as a waste product. It is well-known that brewer's yeast is an exceedingly rich natural source of vitamins B and G-complex, and also contains other desirable nutritional factors. If desired, however, brewer's pure culture yeast, or other suitable yeast, may be employed.

If surplus brewer's yeast is employed, preferably the middle layer of the yeast sediment from the fermenting tank is employed, as it contains a minimum of impurities. This yeast is sieved so as to remove hop residues and other impurities of larger magnitude. If desired, it may be washed, although this has been found unnecessary in most cases.

Solutes

To yeast so prepared, an extractive agent is added. I prefer to use a mixture of common salt (sodium chloride) and cane sugar. These solutes are soluble in beer or water and, when added to the yeast, begin the extraction of the cell contents by plasmolytic action.

If desired, other suitable solutes may be employed. In selecting the solute, characteristics such as non-toxicity, non-deleterious effect on the beer characteristics, capability of inducing plasmolysis, etc., should be kept in mind. Among the edible solutes which may be employed with more or less success are: sugars, such as sucrose, glucose and maltose, sugar preparations, such as sugar syrups and molasses, malt extract, saccharines, gum arabic, sodium chloride, and potassium chloride.

These substances are known as plasmolyzing agents, that is, they have the property of extracting from the yeast-cells at least a portion of the yeast-cell contents, including fluid and soluble constituents thereof.

The proportions of the solutes which may be employed may vary widely, and should be selected in accordance with the other conditions of the brewing process. In the case of common salt and cane sugar I have found it advisable to employ a relatively small quantity of salt, ranging from about ½% to 2%, by weight, based on brewer's yeast of fairly thick consistency. Considerably higher percentages of salt may be employed, but it is advisable not to use too much salt in order to avoid possible impairment of the foam retaining quality of the beer, amongst other things. This, of course, will depend, amongst other considerations, upon how much of the extract is added to a given quantity of beer. When adding the extract from 25 to 50 gallons of brewer's yeast to 100 barrels of beer, I prefer at the present time to employ about ½% of salt, by weight, based on the quantity of brewer's yeast.

As to the amount of cane sugar which may be employed, I prefer to employ a considerably larger amount of sugar than of salt. The proportion of sugar may also vary widely, and is determined, among other factors, by the character of the beer and the amount of extract added to it. Proportions ranging from about 4% to 25%, by weight, based on brewer's yeast of fairly thick consistency have been employed with success. Indeed, the proportion may be considerably higher than this if only a small amount of extract is added to the beer. Good results have been obtained with 15% of sugar when adding the extract obtained from about 25 gallons of yeast to 100 barrels of beer.

Aging and colloid mill treatment

The length of time and the temperature at which the yeast is aged with the solute or solutes, for example, with common salt and cane sugar, may also vary considerably. Generally speaking, I may adopt either of two procedures, depending upon which is more suited to the conditions of the particular brewery in which the process is employed.

In one of these procedures the temperature and duration of the aging period, the length of time and temperature of the treatment in the colloid mill, and the conditions under which the treated yeast issuing from the colloid mill is kept and used, are so controlled that the yeast cells are not killed or their qualities otherwise impaired. To accomplish this the entire processing of the yeast is carried on as at low temperatures as possible, preferably close to zero (centigrade). The aging period will preferably last for from 15 minutes to several hours at a low temperature, although, if desired, it may be extended for a period of several days. The period of aging should not, however, be extended to the point where substantial autolysis occurs, thereby creating harmful substances. When aged for a period of several days, difficulties are sometimes encountered due to the fact that even at very low temperatures some fermentation occurs. To avoid this difficulty, the yeast may be aged first with salt alone, and only a short aging period employed after the sugar has been added.

At the end of the aging period the mixture is passed through a colloid mill. Some brewer's yeasts are sufficiently liquefied by the amount of beer they contain and plasmolysis so as to make further dilution unnecessary. If, however, the yeast is of high consistency, or if compressed yeast is used, further dilution is advisable to assure efficient extraction in the colloid mill. This dilution can be accomplished by the addition of beer or water.

In the colloid mill, due to a combination of hydraulic shearing action, centrifugal force of high magnitude and intensified plasmolysis, efficient extraction of the yeast cell content takes place. The colloid mill is so designed and adjusted that rupture of the yeast cells is avoided.

The colloid mill is preferably of the high speed smooth rotor type. A mill in which the rotor has a peripheral speed of about 15,000 feet per minute and working gaps of approximately 0.003 inch has been found to give good results. Somewhat higher speeds and smaller working gaps, for example, 20,000 feet per minute and 0.002 inch, respectively, may be employed if the construction of the machine permits.

During the course of treatment in the colloid mill the temperature of the yeast will ordinarily increase, unless special cooling means are employed. It is, therefore, desirable to cool the yeast immediately after it issues from the colloid mill. If desired, a cooling system may be built into the colloid mill. If the yeast is recirculated through the mill, an exterior cooling system may be employed with advantage.

When treated in this manner it is found that not only are the yeast cells not destroyed, but they appear to be more highly activated than before. This is evidenced by the fact that if the yeast is used to ferment a wort the final yeast harvest is for a given quantity of treated yeast is greater than for the same quantity of untreated yeast. If the treated yeast is not immediately added to the beer, it is advisable to filter the yeast cells from the extract immediately, in order to avoid possible reabsorption of the vitamins in the extract by the yeast cells.

Since, during this procedure the yeast cells are not killed, autolysis of the yeast cells is avoided. Thus there is no danger of the resulting extract being adversely affected by autolysis.

In many breweries, for practical reasons, it is undesirable to employ the above procedure in which the yeast cells remain alive, because of the constant attention necessary due to the fermenting activity of the cells. In such cases I employ a second procedure in which the fermenting power of the yeast cells is destroyed, but the process is carried out in such a way that autolysis of the yeast cells and rupture of the yeast cell walls are avoided. In this procedure, I employ a short aging period at a considerably higher temperature than employed in the first procedure above described, so as to kill the yeast cells and hence destroy their fermenting activity. The aging period, however, is made sufficiently short so that no substantial autolysis takes place. For this procedure, aging for about ½ hour at about 70° C. is suitable. Considerably shorter times at this elevated temperature may be employed; for example, aging periods varying from 5 to 30 minutes may be employed with more or less success. Also, temperatures above 70° C. may be employed, if desired. I prefer, however, not to employ too long an aging period or too high temperatures in order to avoid adversely affecting the vitamin potency.

After passing the aged mixture through the colloid mill it is then cooled down to a low temperature and the yeast cells filtered from the extract. It is preferable to do this as soon as possible after the colloid mill treatment in order to prevent subsequent autolysis of the yeast cells from adversely affecting the extract.

Certain modifications of the procedures above described are sometimes advantageous. One procedure is to age yeast in the usual manner with common salt and cane sugar at low temperatures and then, previous to extraction in the colloid mill, adding the aged mixture to acidified water having a temperature of from 70° to 95° C. Upon the addition of the yeast the temperature of the water naturally will be lowered, so that the suspension is reheated to about 90° C. This reheating may require about 15 minutes. By this procedure the fermenting power of the yeast is destroyed, but the period is not long enough for appreciable autolysis. The yeast is then extracted in the colloid mill and cooled and filtered as previously described.

Another variation is to remove all fermentable substances from the yeast by washing and pressing it, and then induce plasmolysis by adding a solute or solutes of the saccharine type, or a combination of a salt and saccharine. After aging the mixture at a low temperature for a suitable length of time, the suspension is further extracted in a colloid mill. The advantage of this procedure is that there will be substantially no fermentation during treatment even if room temperatures are reached. The extract will then be separated by filtration, as described hereinbefore.

*Addition of extract to beer*

The extract may be added to the beer at any time during the brewing procedure, depending upon the advantages which it is desired to secure. When the extract is made by the method in which the fermenting power of the yeast cells is not destroyed, both yeast cells and extract may be added to the beer for the main fermentation or for the second fermentation (lager period). It will be understood that in this specification and in the appended claims, the term "beer" includes the liquid while it is being prepared, as well as when it is ready for consumption. When added to the wort for the main fermentation, the fermenting proceeds with greater rapidity than if untreated yeast were used, and tests indicate that a higher degree of fermentation is obtained. In some cases, with untreated yeast, the fermentation does not start readily. When treated yeast is used, this difficulty is removed.

When the treated yeast is used for the main fermentation, the free vitamins in the extracted portion are absorbed by the yeast cells as the fermenting proceeds, and again become unavailable for the finished product. Therefore, I preferably add the treated yeast to the beer toward the end of the second fermentation (or for both the main and second fermentations). When this is done, and the yeast cells are removed in the final filtering operation, tests indicate that the enzymes and vitamins remain in the beverage and are, therefore, available to the consumer. Adding treated yeast during the second fermentation period also appears to quicken the aging and ripening of the beer, and to hasten the settling of the yeast during the lager period.

If the extract is added during the main or after fermentation, the finished beer will not contain all the vitamins which have been added, due to reabsorption by the yeast cells. The amount of reabsorption will depend on the stage at which the extract is added. Therefore, if the primary consideration is the addition of vitamins to the finished beer, and the above advantages derived from adding treated yeast and extract for the main or after fermentations are not thought sufficiently important, the filtered extract may be added to the beer shortly before the final filtration, or preferably, in order to avoid possible vitamin absorption in the beer filter, to the finished beer. This procedure avoids any possible reabsorption of the vitamins by yeast cells during the fermentation and lager periods. Of course, extract may be added at each stage if desired, and treated living yeast used for both main and after fermentation, and in conjunction with untreated yeast.

The filtration of the extract is preferably carried out in a so-called plate and frame type filter press, employing canvas as a filter medium. The filtrate obtained from this press may be irradiated with ultra-violet light so as to antirachicitically activate the extract, thereby producing vitamin D from the pro-vitamin D obtained from the yeast. This enables incorporating vitamin D, as well as vitamins B and G-complex in the beer. Irradiation may be employed before extracting if desired, but it is preferable to irradiate after extraction in order to obtain greatest efficiency. In order to prevent the formation of ozone during irradiation, it is advantageous to provide an atmosphere of a non-deleterious gas, such as $CO_2$.

The filtrate obtained from the plate and frame filter press is usually not brilliant and still contains colloidal turbidities and yeast cells. If the filtrate is added to the beer prior to the final filtration step, these turbidities and cells are removed in the filtration. This final filtration is normally carried out in so-called pulp filters.

There has recently been a tendency among brewers to employ kieselguhr (diatomaceous earth) filters in the final filtration of the beer. Kieselguhr, while being an excellent filter medium, has the tendency to adsorb vitamin B, from the beer. In such a case it is preferable to previously filter the extract to brilliancy and then add it to the finished filtered beer. Even when pulp filters are used it may be desirable to filter the extract to brilliancy before adding it to the beer, the addition being either before or after the final filtration of the beer in the pulp filter. In filtering the extract to brilliancy, it is naturally desirable not to employ a filter medium which tends to absorb the vitamins. A filter employing sintered glass or wool has been found suitable.

Before adding the extract to the beer it may, if desired, be adjusted to the pH of the beer, which is usually between 4.2 and 4.7. This may be accomplished by adding a non-toxic acid such, for example, as lactic acid, tartaric acid, citric acid, acetic acid, etc. This adjustment of the pH value of the extract is particularly desirable when the extract is not used immediately, in order to avoid infection of the extract. A pH value close to 4 is found desirable to help prevent such infection. This feature is of some practical importance, since during the brewing season it is desirable to have the vitamin extract made somewhat in advance of use.

The pH might be adjusted at some other point in the yeast treatment if desired; for example, prior to passing the yeast through the colloid mill. The pH may be adjusted with advantage prior to any heat treatment, in order to minimize destruction of vitamin B by the heat.

The amount of extract which is added to the beer is determined by the amount of vitamins which it is desired to incorporate in the beer. Excellent results have been obtained by the addition of the extract obtained from 15 gallons of brewer's yeast to 100 barrels of beer. Considerably larger amounts of the extract may be added to the beer without adversely affecting the taste and other characteristics of the beer. An amount of extract corresponding to a ratio of about 50 gallons of brewer's yeast per 100 barrels of beer will give a very favorable vitamin/caloric ratio in the finished product.

Depending on the character of the beer, an amount of yeast extract necessary to obtain a desired vitamin potency cannot always be added without producing off-taste. This is especially the case with lighter, pale beers. In such a case I prefer to concentrate the extract to such an extent that small quantities suffice to give the beer the desired vitamin content. For this concentration, I prefer to adjust the pH value of brilliant filtered extract by the use of a non-toxic acid, as mentioned hereinbefore. The acidified extract is then concentrated in a vacuum to a syrup consistency. During this concentration period caramelization of the sugars in the extract takes place, thus removing the yeasty taste and producing a taste resembling that of malt or fruit. Higher acidity produces a more fruity taste. The evaporation may be conducted under vacuum at temperatures of between 40° to 70° C. If during the concentration the pH of the extract should become too low it may be adjusted by adding a suitable alkaline material.

As an aid to the ready practice of the invention the following examples are given, it being understood that the examples are intended as illustrative only, and not as limiting the invention thereto.

Example 1

To 100 kilograms of sieved brewer's surplus yeast are added 1 kilogram of sodium chloride and 15 kilograms of granulated cane sugar. The yeast, which due to the addition of the solutes immediately starts to plasmolize, is kept at a temperature close to zero (C.) and stirred until all of the sugar and salt have dissolved. The suspension is then permitted to age for one hour at a temperature close to zero (C.). The yeast, which by this time has been entirely liquefied by plasmolysis, is now extracted in a colloid mill, avoiding a raise in temperature. The treated yeast suspension, after leaving the colloid mill, is collected in a tank and kept at a temperature low enough to prevent substantial fermentation and autolysis, preferably close to zero. From there it is passed through a filterpress having a canvas filter element, and the issuing filtrate collected. It is preferable to filter the suspension as soon as possible after the colloid mill treatment, so that the cells are removed from the extract without delay. Acetic acid is then added to adjust the hydrogen ion concentration to about pH 4.2. The extract is then given a final filtration in a filterpress having sintered glass, or wool, as a filter medium. This renders the extract cell-free and brilliant. The so-treated extract is then added to a small quantity of beer, where it readily dissolves, and the dissolved extract, containing the vitamins $B_1$ and G-complex and other valuable constituents, is added to 100 barrels of finished filtered beer in such a way that uniform mixing with the beer is assured.

Example 2

To a quantity of sieved brewer's yeast of fairly thick consistency, ½%, by weight, of common salt is added and the mixture aged for about twelve hours at a temperature close to freezing (for example, about 1° C.). Then 6%, by weight, of cane sugar is added, and the mixture aged for about ½ hour at the same temperature. To facilitate dissolving, the sugar may first be dissolved in a sufficient quantity of warm water. The aged mixture is then passed through a colloid mill.

The mixture so treated, containing both yeast cells and extract, is immediately added for the lager period to beer being produced by the Krausen process. About three parts of treated yeast are added to one thousand parts of beer, the basis being the brewer's yeast of fairly thick consistency. Yeast treated in this way may also be added to artificially carbonated beer at the beginning of the lager period.

*Example 3*

To 100 kilograms of sieved brewer's surplus yeast are added 500 grams of sodium chloride and 10 kilograms of granulated cane sugar. The yeast is kept at a temperature close to zero (C.) and stirred until all the sugar and salt are dissolved. The suspension is then permitted to age for about 10 minutes at a temperature close to zero. The yeast, which by then has plasmolized, is circulated in a colloid mill until the extract has acquired a temperature of about 90° C. The required time will vary with the capacity of the machine, but in one case was found to take about twenty minutes. In this case the fermenting power of the yeast cells is destroyed, due to the heat, but they are not ruptured. The treated yeast suspension is collected in a tank provided with a cooling system. There the extract is cooled down to about 2° C. in about one-half hour. From there it is passed through a canvas filterpress and the issuing filtrate collected. This filtration is preferably done as soon as possible after the extraction, to avoid any possible autolysis of the yeast cells affecting the extract. A non-toxic acid, as for instance acetic acid, is added to the filtered extract so as to adjust the hydrogen ion concentration to about pH 4.2. The rest of the procedure of filtering the extract again and adding it to the beer is the same as in Example 1.

*Example 4*

The yeast is treated in exactly the same way as in Example 3, but instead of filtering the extract in the canvas filterpress only once, it is recirculated through this filterpress until the extract becomes fairly clear. The extract is then irradiated and subsequently added to the lager tank in which the beer has undergone one pre-filtration. The beer is subsequently filtered to brilliancy in a pulp filter, the filter preferably having a filter mass free of paper so as to avoid reabsorption of the vitamins.

*Example 5*

To 100 kilograms of sieved brewer's yeast are added 500 grams of sodium chloride and 10 kilograms of cane sugar. The mixture is stirred at a temperature close to freezing point until the salt and sugar are dissolved and plasmolysis has started. The plasmolyzed yeast is then added to 20 liters of slightly acidified hot water of about 95° C. in a steam heated kettle, the yeast being added slowly so that the temperature of the mixture does not sink below about 75° C. As soon as the entire yeast is introduced the temperature is raised to about 90° C. and kept there for a few minutes. The yeast is then extracted in a colloid mill. The further treatment of the extract is identical with the treatment described in Example 3.

*Example 6*

Brewer's surplus yeast is first sieved and washed. 100 kilograms of this yeast is then added to 30 liters of slightly acidified hot water of about 95° C. in a steam heated kettle, the yeast being added slowly so that the temperature of the mixture does not sink below about 75° C. The water is acidified with a non-toxic acid, for example, with acetic or lactic acid. As soon as the entire yeast is introduced, 30 kilograms of cane sugar syrup (containing about 30% water) is introduced, and, under constant stirring of the mixture, the temperature is raised to about 90° C. and kept there for a few minutes. The yeast is then extracted in a colloid mill and the treated mixture collected and cooled down to about 1° C. The further treatment of the extract is the same as described in Example 3.

*Example 7*

Brewer's yeast of average consistency is heated to about 80° C. Then ½% of common salt and 15% cane sugar, by weight, based on the weight of the brewer's yeast, is added. The mixture is kept at about 80° to 85° C. for a period of twenty to thirty minutes. During this heating and aging period the mixture is stirred.

The aged mixture is then immediately passed through the colloid mill, the temperature of the treated material issuing from the colloid mill remaining at about 80° C. The treated mixture is then passed into a receptacle and immediately cooled down to approximately 2° C. As soon as the mixture is cooled, which may take approximately one-half hour, or less, the mixture is filtered in a canvas filterpress. Preferably, the extract is recirculated through the filter press until a clear filtrate is obtained. The filtrate is then added to the beer in the lager tanks at the end of the lager period, and shortly before the final filtration (which is carried out in pulp filters). The filtrate from 25 gallons of brewer's yeast is added to 100 barrels of beer. If the filtrate is not added immediately to the beer, the pH is adjusted to between 4.2 and 4.5 by the addition of a suitable quantity of lactic acid. Even when the filtrate is added to the beer immediately, it is preferable to adjust the pH value in this manner.

If in the regular brewing procedure the beer is subjected to a slow artificial carbonation treatment for a period of a few days prior to the final filtration, the filtrate may be added to the beer at the beginning of this carbonation period.

Beer made as described in this example has been found to contain at least 8 International units of vitamin B per 12 oz. bottle.

If so desired, in the examples just given, the extract may be concentrated in the manner described hereinbefore. Also, ultra-violet irradiation may be employed.

When the process hereinbefore described is used it is found that a beer of high vitamin potency can be obtained without adversely affecting the other qualities of the beer. Indeed, in many cases improved color, taste, aroma and foam-keeping qualities are noted. Furthermore, although considerable yeast cell content is added to the beer no yeasty taste is noticed. The treatment has also been found to have positive value in preventing deterioration of the taste of the beer when it is pasteurized. This is important since pasteurization usually impairs the taste of beer brewed in the ordinary manner. The keeping qualities of the beer also have been found to be excellent.

In the practical carrying out of my process on a commercial scale, it is desirable to employ a colloid mill which is so designed and constructed that the treatment of large quantities of yeast may be carried out rapidly and efficiently in as short a time and with as little attention as possible. The colloid mill illustrated in Figs. 1 to 6 has been designed to meet these requirements. It will be understood that it is not necessary to employ a colloid mill of this construction in the carrying out of my process, but that any other suitable construction may be employed if desired.

In the drawings:

Fig. 2 is an elevation of the colloid mill;

Fig. 3 is an elevation showing the assembly of the colloid mill and the driving motor;

Fig. 4 is a detail of the valve shown at 69 in Fig. 2;

Fig. 5 is a detail showing means for adjusting the stators;

Fig. 6 is a detail showing means for measuring the pressure in the working gap; and Fig. 7 is a flow sheet showing an arrangement of apparatus suitable for carrying out the processes of the invention.

Figure 1:
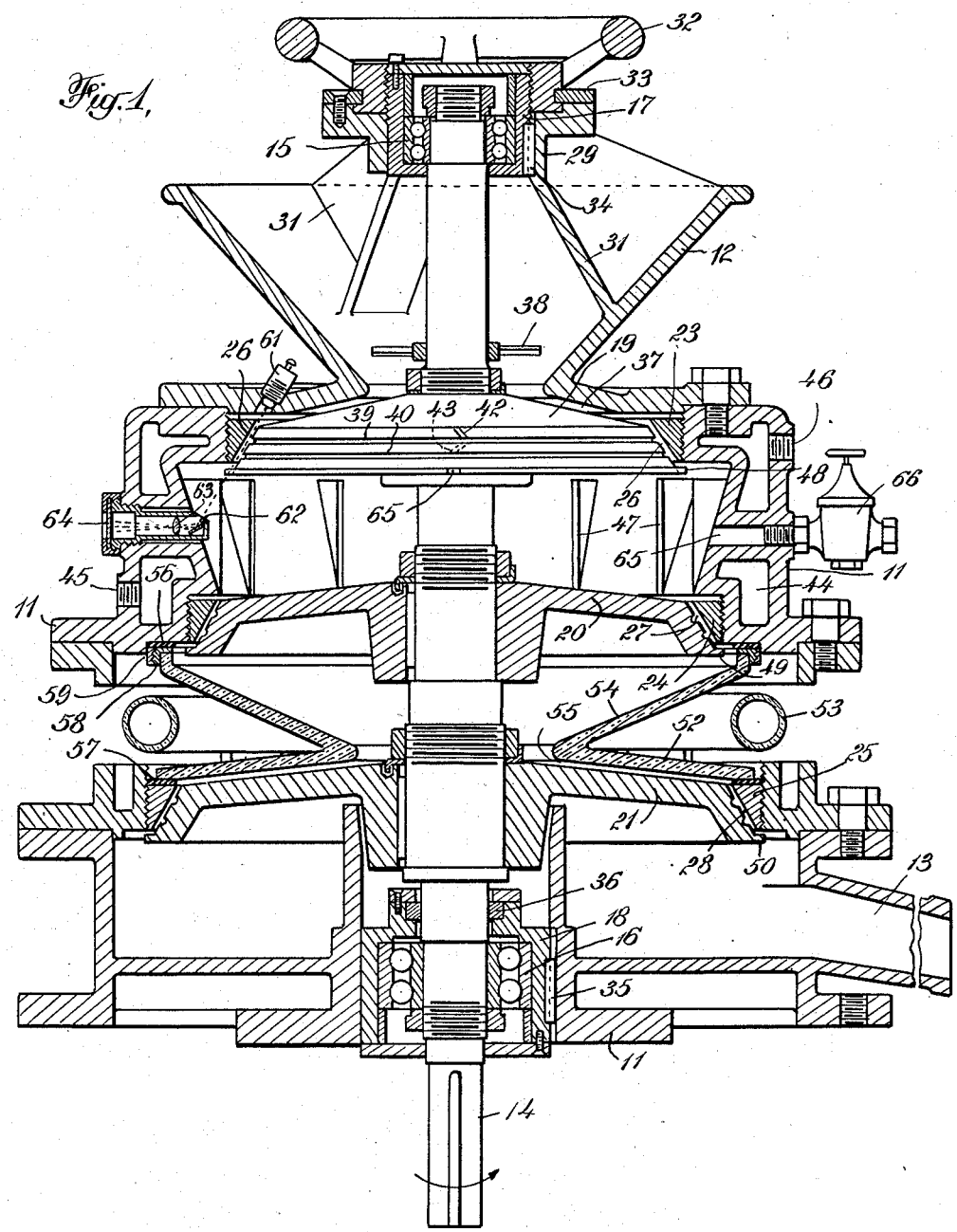
Figure 1 is a vertical section of the colloid mill taken along the axis of the machine, one rotor being shown in full.

Referring to Fig. 1, the casing 11 is provided with a hopper 12, into which the yeast to be treated is fed, and an outlet port 13 for withdrawing the treated yeast material. Shaft 14 is rotatably mounted in casing 11 by ball-bearings 15, 16 and the corresponding bearing housings 17, 18, and has mounted thereon the axially-spaced, frusto-conical rotors 19, 20 and 21. Encircling the rotors in closely adjacent, non-contacting relationship are the stators 23, 24 and 25, which are adjustably mounted within casing 11. The rotors and their cooperating stators define the respective working gaps 26, 27 and 28.

Bearing housing 17 is slidably mounted in the supporting member 29 which is secured within the hopper 12 by the arms 31. Bearing housing 18 is also slidably mounted in casing 11. The axial position of the shaft 14 is adjusted by means of the wheel 32 which can be rotated, but is restrained from axial movement by the tongues 33. Wheel 32 is threaded to the upper portion of bearing housing 17 so that by turning the wheel the axial position of the housing 17, and therefore of the shaft 14, may be changed, thus changing the width of the working gaps 26, 27 and 28. The bearing housing 18, being adapted to slide in casing 11, follows the movement of the upper housing without further adjustment. Feather keys 34 and 35 prevent the corresponding housings from turning in their supports, and packing 36 is provided to prevent any fluid yeast from entering the ball-bearing 16.

Yeast is fed into the hopper 12 and passes over the inlet surface 37 of rotor 19 to the working gap 26. Two small blades 38 are provided on shaft 14 to agitate the material and thoroughly mix it before it enters the working gap.

Rotors 19, 20 and 21 are provided with the circumferential grooves 39 and 40. Since all the rotors are similar, only the grooves on rotor 19 will be referred to in detail. Groove 39 is connected to the inlet surface 37 by channel 42, and with groove 40 by the diametrically opposite channel 43. Most of the material which flows over surface 37 enters the working gap 26, but a portion will enter channel 42 and flow down to groove 39, where it will be distributed around the circumference of the rotor and mixed with the partially treated material which has passed through the first section of the working gap. Most of the material then passes into the second section of the working gap, but a portion will enter the channel 43 and flow into groove 40 where it will again be distributed around the circumference of the rotor and mixed with the material which has been treated in the second portion of the gap. Finally, all the material passes into the last section of the working gap and undergoes further treatment.

Since the channels 42 and 43 are recessed in the surface of the rotor, the material can flow more readily through them than through the working gap, so that there will always be sufficient material to completely fill the middle and last sections of the working gap despite the enlarging cross-section of the gap and the greater centrifugal forces acting on the portions of the material near the outlet. Channels 42 and 43 are inclined somewhat backward to prevent too rapid a flow of material to the grooves, and placed at diametrically opposite points so as to insure the mixing of the untreated material in channel 42 with the partially treated material which comes through the first section of the working gap, before entering channel 43.

Casing 11 is provided with a water jacket 44, having inlet and outlet ports 45 and 46, respectively, and a series of projecting fins 47 which assist in cooling the material. In order to insure all the material coming in contact with the fins or the casing walls, there are provided baffles 48, 49, 50, which radially project from the conical surfaces of the corresponding rotors at the outlet ends of their respective working gaps. As the treated material leaves the working gap, it is diverted and thrown off by the baffle onto the casing walls. This insures the material coming in contact with as much of the cooling surface as possible.

Casing 11 is also provided with a section 52 of material transparent to ultra-violet radiation, such as quartz glass. The section is shaped to receive the material as it is thrown off baffle 49 and expose it to the radiation from the mercury vapor lamp 53, as it flows down the surface 54. The material is then confined in the narrow gap 55 between section 52 and the inlet surface of rotor 21, as it passes to the working gap 28. Due to the high rotor speed employed in the operation of the apparatus the material in gap 55 is highly agitated, and thus all portions of the material are subjected to the direct action of the radiation from lamp 53 in a thin, highly agitated layer, thereby insuring very efficient irradiation. If desired, to prevent overheating of the material, the section 52 may be air-cooled. Since the yeast has undergone treatment in two working gaps before irradiation, much of the cell content has already been extracted. This assures efficient irradiation of the extract.

In order to permit adjusting stator 25 and still prevent leakage of material past the ends of the transparent section, the rubber gaskets 56 and 57, and the threaded annular ring 58 and ring nut 59 are provided. When the desired adjustment of the stator has been made, ring 58 and ring nut 59 are relatively rotated so that ring 58 bears down on section 52 while ring nut 59 presses up on gasket 56. Thus a tight connection between section 52 and casing 11 is assured. The individual stator adjustments permit adjustment of the working gaps so that each handles the material with the same rapidity. Thereafter, wheel 32 permits simultaneous adjustment of the gaps according to the operating conditions and amount of treatment desired.

The means for determining the width of the working gaps is indicated by numerals 61—64. The beam from an electric light 61 is directed through gap 26 and the transmitted beam diverted through an opening in casing 11 by the reflector 62. The reflected beam is magnified by a suitable lens system 63 and impinges upon the ground glass plate 64, which may have gauge lines etched therein for determining the width of the beam. Further magnification can be employed if desired. In order to permit the transmitted beam to pass the baffle 48, a notch 65 is provided, the high speed of the rotor making the light passing through this notch appear steady to the observer. This permits ready determination of the width of the working gaps while the extractor is in operating condition. By properly adjusting the extractor, a uniform specified amount of treatment may be given to the yeast and large quantities of yeast may be treated rapidly and efficiently.

Casing 11 is also provided with an opening 65 and a pressure reduction valve 66 through which $CO_2$, or other suitable non-deleterious gas may be introduced into the extractor. The introduction of $CO_2$ under a pressure greater than atmospheric pressure, before the operation is begun, will remove any oxygen within the extractor and thereby prevent the formation of ozone during subsequent irradiation. If necessary, $CO_2$ may be introduced during the operation also.

Referring now to Fig. 2, pressure gauge 67 and vacuum gauge 68 are connected to the valve 69. Pipe 70, communicating with the chamber between rotors 19 and 20, and pipe 71, communicating with the chamber between rotors 20 and 21, are also connected to valve 69. The valve (Fig. 4) comprises an outer casing 69 provided with four ports to which the gauges and pipes are attached. Within casing 69 is a rotatable member 72 containing a right angle passageway, as shown. By turning member 72 either gauge 67, 68, may be connected to either pipe 70, 71, thus permitting the pressure conditions in both chambers to be conveniently determined. It has been found that sometimes, when the yeast is not sufficiently dilute, the treatment results in the material issuing from one of the working gaps in the form of a thick paste, rather than in the desired fluid form. If this occurs, the yeast can not pass through the subsequent gap so a pressure will build up in the chamber and will be indicated by gauge 67. To correct this condition, the incoming yeast should be made more dilute. If, on the other hand, a rotor handles material faster than the preceding one, a vacuum may be created int he intervening chamber and may be determined by gauge 67. Thermometer 73 is provided to indicate the temperature of the treated material.

Fig. 3 illustrates a suitable drive for the centrifugal extractor. The extractor 11 and a suitable electric motor 74, preferably of splash-proof design, are mounted on a base 75. The two units are connected together with a flexible drive 76, such as a "Texrope" drive, and a belt tightener 77 is provided to give the requisite tension. The opening 78 in base 75, which permits easy access to the driving belt, is closed by a cover to render the drive splashproof.

Fig. 5 shows means whereby the stators may be conveniently adjusted from the exterior of the casing. A worm gear 79 is suitably mounted in casing 11 and engages a cooperating threaded portion of stator 23. As the worm gear is turned the stator is caused to rotate about its axis and, being threaded to casing 11, this results in an axial movement of the stator and corresponding adjustment of the working gap.

As shown in Fig. 6, a small passageway 80 may be provided in stator 23, communicating with the working gap 26. When the machine is operating the pressure developed in the gap is communicated through passageway 80, and a connecting flexible tube 81, to a suitable pressure gauge (not shown). The pressure reading so obtained will give an indication of the fluidity of the material in the gap, and thus indirectly indicate whether or not the material has been diluted to the proper degree.

Referring now to Fig. 7, a flow sheet is shown of an arrangement of apparatus suitable for carrying out the processes described hereinbefore, especially those described in the specific examples. A kettle 82, in which the yeast and solute is aged, is provided with a steam jacket 83 and cooling coils 84, so that the yeast mixture may be heated or cooled, as desired, during the aging period. A mixer 85 is also provided for stirring the contents. From the kettle the aged mixture is passed through pipe 86, which is provided with a valve, into the colloid mill 87, the mill being driven by a motor 88. The colloid mill may be of any suitable type, as, for example, the one illustrated in Figs. 1 to 6.

A suitable source 89 of ultra-violet rays is positioned to irradiate the yeast mixture. This is shown only diagrammatically, and may be the irradiating means shown in Fig. 1.

From the colloid mill the treated mixture is passed through pipe 91 into tank 92. Cooling coils 93 are provided in this tank for cooling the treated mixture. A suitable valve is provided at the outlet of the tank. The cooled yeast is withdrawn from tank 92 by the centrifugal pump 94 and delivered under pressure through pipe 95 to the plate and frame filterpress 96. In the outlet pipe of the filterpress is provided a two-way valve 97 so that the extract may be delivered into pipe 98 for recirculation through the tank 92 and filterpress 96, or may be delivered directly into pipe 99 leading to tank 101.

The extract is withdrawn from tank 101 by centrifugal pump 102 and delivered under pressure to the filter press 103. This press may be of the type employing sintered glass, or wool, as a filter medium. If desired, any other suitable filter medium may be employed which does not absorb the vitamins from the extract.

From the second filter press 103 the extract is passed into tank 104, the outlet of which is provided with a valve, and thence into the vacuum pan 105. The vacuum pan is provided with a hot water jacket 106 for heating the extract for concentration. A suitable vacuum is maintained in the vacuum pan by means of the vacuum pump 107.

From the foregoing description of my invention it will be appreciated that I have provided a marked improvement in the process of brewing beer, and that this improvement is of considerable importance to the health of the beer-consuming public. It will also be appreciated that although the process involving the preparation and utilization of yeast cell extract has been developed primarily for the brewing industry, and is especially adapted therefor, the extract itself, because of its agreeable flavor and vitamin potency, has other valuable uses. Thus the extract itself may be used as a tonic, or it may be added to potables other than beer in order to increase their nutritional and health-giving properties. In such cases the brilliance and freedom from cloudiness of the extract may be especially advantageous.

I claim:

1. In the process of brewing beer, the improvement which comprises treating yeast in a colloid mill in the presence of a plasmolyzing agent to extract at least a portion of the yeast-cell contents without disruption of a substantial quantity of the yeast cells and without substantial autolysis of the yeast, and adding at least a portion of the treated material to the beer.

2. In the process of brewing beer, the improvement which comprises treating yeast in a colloid mill in the presence of salt and sugar to extract at least a portion of the yeast-cell contents without substantial autolysis of the yeast, and adding at least a portion of the treated material to the beer.

3. In the process of brewing beer, the improvement which comprises aging a mixture containing yeast and a plasmolyzing agent, treating the aged mixture in a colloid mill to extract at least a portion of the yeast-cell contents, the temperature and duration of the aging and of the colloid mill treatment being controlled so that substantial autolysis of the yeast is avoided, and adding at least a portion of the treated material to the beer.

4. In the process of brewing beer, the improvement which comprises aging at a low temperature a mixture containing yeast and a plasmolyzing agent, treating the aged mixture in a colloid mill without disruption of a substantial quantity of yeast cells, the temperature and duration of the aging and of the colloid mill treatment being controlled so that a portion of the yeast cell content is extracted without substantial autolysis of the yeast and without killing the yeast cells, and adding at least a portion of the treated material to the beer.

5. In the process of brewing beer, the improvement which comprises heating a mixture containing yeast and a plasmolyzing agent to a degree such that the fermenting power of the yeast is substantially destroyed, treating the mixture after said heating in a colloid mill without disruption of a substantial quantity of yeast cells, the temperature and duration of the heating and of the colloid mill treatment being controlled so that a portion of the yeast cell content is extracted without substantial autolysis of the yeast, and adding the extracted portion of the yeast cell content to the beer.

6. In the process of brewing beer, the improvement which comprises heating a suspension containing yeast, salt and sugar to a degree sufficient to substantially destroy the fermenting power of the yeast, treating the mixture after said heating in a colloid mill without disruption of a substantial quantity of yeast cells, the temperature and duration of the heating and of the colloid mill treatment being controlled so that a portion of the yeast cell content is extracted without substantial autolysis of the yeast, and adding the extracted portion of the yeast cell content to the beer.

7. In the process of brewing beer, the improvement which comprises heating a mixture containing yeast, a plasmolyzing agent and an aqueous medium to a temperature not exceeding about 95° C. and for a period not exceeding about an hour to substantially destroy the fermenting power of the yeast, the yeast being added to the aqueous medium while the aqueous medium is maintained at an elevated temperature not exceeding about 95° C., treating the mixture after said heating in a colloid mill without disruption of a substantial quantity of yeast cells, the temperature and duration of the heating and of the colloid mill treatment being controlled so that a portion of the yeast cell content is extracted without substantial autolysis of the yeast, and adding the extracted portion of the yeast cell content to the beer.

8. In the process of brewing beer, the improvement which comprises preparing a mixture containing yeast and a plasmolyzing agent comprising a sugar, treating said mixture in a colloid mill without disruption of a substantial quantity of yeast cells, said preparing and the temperature and duration of the colloid mill treatment being controlled so that a portion of the yeast cell content is extracted without substantial autolysis of the yeast, caramelizing the extract so obtained by heat treatment thereof, and subsequently adding the caramelized extract to the beer.

9. In the process of brewing beer, the improvement which comprises aging a mixture containing yeast and a sugar, treating the aged mixture in a colloid mill without disruption of a substantial quantity of yeast cells, the temperature and duration of the aging and the colloid mill treatment being controlled so that a portion of the yeast cell content containing vitamins is extracted without substantial autolysis of the yeast, removing the yeast cells from the extract so obtained, adjusting the pH value of the yeast material during the course of the treatment thereof to obtain a pH value of about 4.0–4.7 in the extract, caramelizing the extract having said pH value by heating in vacuo, the temperature and length of heating being controlled so as not to destroy the vitamin potency of the extract, and subsequently adding the extract so prepared to the beer.

10. In the process of brewing beer involving the preparation of a vitamin yeast-cell extract by treating a yeast suspension in a colloid mill in the presence of a plasmolyzing agent and adding the extract to the beer, in which preparation the yeast or yeast extract becomes heated, the improvement which comprises adjusting the natural pH of the yeast material with a non-toxic acid prior to said heating to diminish the deleterious effect of the heating on the vitamin potency.

11. In the process of brewing beer involving the preparation of a vitamin yeast-cell extract by aging a mixture of yeast, salt and sugar and treating the aged mixture in a colloid mill, and then incorporating the extract in the beer, in which preparation the yeast or yeast extract becomes heated, the improvement which comprises adjusting the natural pH of the yeast material prior to said heating to a pH of about 4.0–4.7, whereby the deleterious effect of the heating on the vitamin potency may be diminished.

12. In the process of brewing beer, the improvement which comprises aging a quantity of yeast in the presence of salt and sugar at a low temperature, avoiding substantial autolysis and destruction of the yeast cells, treating said mixture in a colloid mill in such a manner that a portion of the contents of the yeast cells is extracted without disruption of a substantial quantity of cells, and adding at least a portion of said mixture so treated to the beer during the brewing process.

13. In the process of producing beer involving the preparation of yeast-cell extract containing yeast vitamins and the incorporation of the extract in the beer, the improvement which comprises preparing the yeast-cell extract for incorporation in the beer by a process comprising treating yeast in a colloid mill in the presence of salt and sugar to extract a portion of the yeast-cell content without disruption of a substantial quantity of the yeast cells.

14. In the process of producing beer involving the preparation of yeast-cell extract containing yeast vitamins and the incorporation of the extract in the beer, the improvement which comprises preparing the yeast-cell extract for incorporation in the beer by a process comprising aging a mixture of yeast, salt and sugar under such conditions of time and temperature as to avoid substantial autolysis of the yeast cells, and treating said aged mixture in a colloid mill to extract a portion of the contents of the yeast cells without disruption of a substantial quantity of the yeast cells.

15. The process of preparing beer containing yeast vitamins which comprises adding yeast to beer wort, permitting fermentation to proceed to propagate the yeast and secure an alcoholic content, separating yeast from the fermented wort, aging a mixture of the yeast and a relatively small quantity of salt and sugar under such conditions of time and temperature as to avoid substantial autolysis of the yeast cells, treating the aged mixture in a colloid mill to extract contents of the yeast cells without disruption of a substantial quantity of yeast cells, separating the yeast cells from the extract, and incorporating the extract with beer after the second fermentation period thereof, whereby a finished beer containing yeast vitamins may be obtained.

16. A beer containing yeast vitamins, but substantially free of yeast cells, having incorporated therein a yeast-cell extract substantially free of products of autolysis and containing yeast vitamins, and prepared by the process comprising aging a mixture of yeast, salt and sugar under such conditions of time and temperature as to avoid substantial autolysis of the yeast cells, and treating the aged mixture in a colloid mill to extract a portion of the yeast cell content without disruption of a substantial quantity of the cells.

17. A beer containing yeast vitamins, but substantially free of yeast cells, having incorporated therein a yeast-cell extract substantially free of products of autolysis and containing yeast vitamins prepared by the process comprising admixing yeast and a plasmolyzing agent, treating the mixture in a colloid mill without disruption of a substantial quantity of yeast cells, the temperature and duration of the admixing step and of the colloid mill treatment being controlled so that a portion of the yeast cell content is extracted without substantial autolysis of the yeast, thereby obtaining said yeast-cell extract.

18. A process of producing a yeast-cell extract which comprises treating yeast in a colloid mill in the presence of salt and sugar to extract at least a portion of the yeast cell content.

19. A process of producing a yeast-cell extract which comprises aging at a low temperature a mixture containing yeast, sugar and a small quantity of salt, and treating the aged mixture in a colloid mill without disruption of a substantial quantity of yeast cells, the temperature and duration of the aging and of the colloid mill treatment being controlled so that a portion of the yeast cell content is extracted without substantial autolysis of the yeast and without killing the yeast cells.

20. A process of producing a yeast-cell extract which comprises aging a mixture containing yeast and at least one plasmolyzing agent of the group consisting of sugars, molasses, malt extract, gum arabic, sodium chloride and potassium chloride, and treating the aged mixture in a colloid mill without disruption of a substantial quantity of yeast cells, the temperature and duration of the aging and of the colloid mill treatment being controlled so that a portion of the yeast cell content is extracted without substantial autolysis of the yearst.

21. A vitamin product comprising a yeast-cell extract substantially free of products of autolysis and obtained by the process comprising admixing yeast and a plasmolyzing agent, and treating the mixture in a colloid mill without disruption of a substantial quantity of yeast cells, the temperature and duration of the admixing step and of the colloid mill treatment being controlled so that a portion of the yeast cell content is extracted without substantial autolysis of the yeast.

22. A vitamin product comprising a yeast-cell extract substantially free of products of autolysis and obtained by aging a mixture of yeast, salt and sugar, and treating the aged mixture in a colloid mill without disruption of a substantial quantity of yeast cells, the temperature and duration of the aging and of the colloid mill treatment being controlled so that a portion of the yeast cell content is extracted without substantial autolysis of the yeast.

23. In the process of brewing beer, the improvement which comprises admixing yeast and at least one plasmolyzing agent of the group consisting of sugars, molasses, malt extract, gum arabic, sodium chloride and potassium chloride, treating the mixture in a colloid mill in such a manner that a portion of the contents of the yeast cells is extracted without disruption of a substantial quantity of cells, substantial autolysis of the yeast during the course of treatment thereof being avoided, and adding at least the extracted cell content to the beer.

24. A process of producing a yeast-cell extract which comprises admixing the yeast and a plasmolyzing agent therefor, and treating the mixture in a colloid mill in such a manner that a portion of the contents of the yeast cells is extracted without disruption of a substantial quantity of cells, substantial autolysis of the yeast during the course of treatment thereof being avoided.

25. A process of producing a yeast-cell extract which comprises heating a suspension containing yeast and at least one plasmolyzing agent selected from the group consisting of sugars, molasses, malt extract, gum arabic, sodium chloride and potassium chloride to a degree sufficient to substantially destroy the fermenting power of the yeast, treating the mixture after said heating in a colloid mill without disruption of a substantial quantity of yeast cells, the temperature and duration of the heating and of the colloid mill treatment being controlled so that a portion of the yeast cell content is extracted without substantial autolysis of the yeast.

26. A process of producing a yeast-cell extract which comprises preparing a mixture containing yeast and a plasmolyzing agent comprising sugar, treating said mixture in a colloid mill without disruption of a substantial quantity of yeast cells, said preparing and the temperature and duration of the colloid mill treatment being controlled so that a portion of the yeast cell content is extracted without substantial autolysis of the yeast, removing the yeast cells from the extract so obtained, and thereafter caramelizing the extract by heat treatment thereof.

27. A process of producing a yeast-cell extract which comprises aging a mixture of yeast, salt and sugar under such conditions of time and temperature as to avoid substantial autolysis of the yeast-cells, and treating said aged mixture in a colloid mill to extract a portion of the contents of the yeast-cells without disruption of a substantial quantity of the yeast-cells.

28. A process of producing a yeast-cell extract which comprises heating a suspension containing yeast, salt and sugar to a degree sufficient to substantially destroy the fermenting power of the yeast, and treating the mixture after said heating in a colloid mill without disruption of a substantial quantity of yeast cells, the temperature and duration of the heating and of the colloid mill treatment being controlled so that a portion of the yeast-cell content is extracted without substantial autolysis of the yeast.

29. A process of producing a yeast-cell extract which comprises aging a mixture containing yeast, and a sugar, treating the aged mixture in a colloid mill without disruption of a substantial quantity of yeast-cells, the temperature and duration of the aging and the colloid mill treatment being controlled so that a portion of the yeast-cell content containing vitamins is extracted without substantial autolysis of the yeast, removing the yeast cells from the extract so obtained, adjusting the pH value of the yeast material during the course of the treatment thereof to obtain a pH value of the order of 4.0–4.7 in the extract, and caramelizing the extract having said pH value by heating in vacuo, the temperature and length of heating being controlled so as not to destroy the vitamin potency of the extract.

30. A process of producing a yeast-cell extract which comprises heating a mixture containing yeast and a plasmolyzing agent therefor to a degree such that the fermenting power of the yeast is substantially destroyed without substantial autolysis of the yeast, and treating the mixture after said heating in a colloid mill to extract at least a portion of the yeast-cell content.

31. A process of producing a yeast-cell extract which comprises heating a mixture containing yeast and a plasmolyzing agent therefor to a degree such that the fermenting power of the yeast is substantially destroyed, and treating the mixture after said heating in a colloid mill without disruption of a substantial quantity of yeast cells, the temperature and duration of the heating and of the colloid mill treatment being controlled so that a portion of the yeast cell content is extracted without substantial autolysis of the yeast.

32. A process of producing a yeast-cell extract which comprises aging a mixture of yeast with a plasmolyzing agent comprising sugar under such conditions of time and temperature as to avoid substantial autolysis of the yeast cells, and treating said aged mixture in a colloid mill to extract at least a portion of the contents of the yeast cells without disruption of a substantial quantity of the yeast cells.

33. A process of producing a yeast-cell extract which comprises aging a mixture of yeast with a plasmolyzing agent comprising sodium chloride under such conditions of time and temperature as to avoid substantial autolysis of the yeast cells, and treating said aged mixture in a colloid mill to extract at least a portion of the contents of the yeast cells without disruption of a substantial quantity of the yeast cells.

ALBERT M. FISCHER.